(12) United States Patent
Tobiyama et al.

(10) Patent No.: US 7,818,122 B2
(45) Date of Patent: Oct. 19, 2010

(54) NAVIGATION DEVICE, METHOD AND PROGRAM

(75) Inventors: Hiroyuki Tobiyama, Tokyo (JP); Masato Takahashi, Tokyo (JP); Takao Yahiro, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 992 days.

(21) Appl. No.: 10/558,841

(22) PCT Filed: May 21, 2004

(86) PCT No.: PCT/JP2004/006941

§ 371 (c)(1),
(2), (4) Date: Nov. 28, 2006

(87) PCT Pub. No.: WO2004/106860

PCT Pub. Date: Dec. 9, 2004

(65) Prior Publication Data

US 2007/0179711 A1   Aug. 2, 2007

(30) Foreign Application Priority Data

May 29, 2003   (JP)   .............................. 2003-153490

(51) Int. Cl.
*G01C 21/00* (2006.01)
(52) U.S. Cl. .................... 701/211; 701/200; 340/995.24
(58) Field of Classification Search ......... 701/200–202, 701/211, 25, 28; 340/988, 995.1, 995.19, 340/995.24

See application file for complete search history.

(56) References Cited

U.S. PATENT DOCUMENTS 6,128,571 A * 10/2000 Ito et al. ..................... 701/201
6,282,493 B1 * 8/2001 Kitagawa et al. ............ 701/211

FOREIGN PATENT DOCUMENTS

| JP | 08-304085 | 11/1996 |
| JP | 2001-264083 | 9/2001 |

* cited by examiner

*Primary Examiner*—Yonel Beaulieu (57) ABSTRACT

A navigation device, method, and program provides output information on service facilities that exist on a road such as an expressway. A display provides a map in a general road display mode that includes facilities such as general roads, family restaurants, and convenience stores, and also can display a highway mode. The highway mode can be a predetermined expressway display mode which displays expressways and facilities on the expressways, and combines a single map focusing mainly on expressways so that the expressways can be easily recognized along with vehicle moving images. A searching and outputting portion searches for a predetermined number of facility information items of a desired type of element facility from the road map data in accordance with a provided predetermined operation, and outputs the information items when the present location is in the expressway display mode, and an element facility exists ahead on the expressway.

14 Claims, 7 Drawing Sheets

POSITION OF THE VEHICLE                    TRAVELING DIRECTION

Fig. 10

| GAS STATION & RESTAURANT INFORMATION ||
|---|---|
| SERVICE AREA A<br>GS (GAS STATION) a | SERVICE AREA A<br>GS (GAS STATION) a |
| SERVICE AREA C<br>GS (GAS STATION) c | SERVICE AREA B<br>GS (GAS STATION) b |

NAVIGATION DEVICE, METHOD AND PROGRAM

TECHNICAL FIELD

The present invention relates to a navigation device, method, and program for outputting information on a desired type of element facility, which exists on an expressway, with simple operation during driving on the expressway.

BACKGROUND ART

Recently, the navigation technology has developed rapidly along with the automotive and digital technologies. Navigation means that an in-vehicle device using the map data displays a position of the vehicle, which is detected by a GPS or the like in a consecutive fashion, on a screen of a circumference map, and uses the display on the screen and speech synthesis to lead and guide the traveling direction and the like the vehicle to a specified destination along a most suitable guidance route.

A conventional navigation device has a so-called "highway mode" as a map display mode used when driving on an expressway, and information on parking areas in the vicinity of a vehicle position, service areas, interchanges and the like is displayed in an array in this mode. Further information can be viewed by scrolling this display (see Japanese Patent Application Laid-Open No. 2000-337896, for example).

It should be noted in the present application that "expressway" not only is a name or standard of a road such as "automobile road", but also covers general roads, side walks, and a wide range of roads with predetermined configurations, which are isolated from sites of private residences and limit freedom of parking.

Incidentally, in order to have a pleasant ride, it is important to appropriately secure stop-off points for dining, restrooms, rest, fueling, shopping, making phone calls and the like. Particularly, expressways have much limitations as compared to general roads because these stop-off points are limited to a predetermined facility such as a parking area, thus securing the stop-off points needs to be well-planned.

Moreover, facilities such as parking areas and service areas differ specifically in terms of which type of facility as the element, such as a gas stations and a restaurant (referred to as "element facility" in the present application), is provided in these facilities. Therefore, when, for example, fueling and dining facilities are required, it is necessary to determine where in the facilities along the way the required element facilities are located.

However, the conventional technology described above has a problem that, when searching for a desired facility such as a neighborhood gas station or a restaurant during driving on an expressway, the facility has to be searched manually with eyes or by scrolling the display for hours if the facility does not exist in the displayed range, thus the operability of the conventional technology is poor in this respect.

The present invention is to solve the problems described above, and an object thereof is to provide a navigation device, method, and program for outputting information on a desired type of element facility, which exists on an expressway, with simple operation during driving on the expressway.

DISCLOSURE OF THE INVENTION

In response to the abovementioned object and effects from the object which are disclosed hereinafter, the present invention is described as follows. First of all, the present invention is a navigation device which displays a present location, searches for and guides on a route to a destination, on the basis of a prepared road map and data of facilities, the device, comprising searching and outputting means for searching for and outputting a predetermined number of facility information items of a desired type of element facility included in facilities existing ahead on an expressway, when the present location is on an expressway, from the data in accordance with a predetermined operation performed, and, a searching and outputting means is configured to simultaneously output at least two or more of the facilities including facility information of at least any two or more element facilities.

According to the present invention, if the present location is on the expressway, a predetermined simple operation by pressing an information key or the like allows to search a predetermined number, that is, two or three facility information items of a predetermined type of element facility such as a gas station or restaurant in a service area (SA) or parking area (PA), which exists ahead in the traveling direction on the expressway, in the order of nearest to furthest from the present location, and to output the searched information items by means of the display on the screen and speech synthesis. Accordingly, the information on the desired type of element facility existing on the expressway can be output with simple operation.

In a preferred embodiment, the searching and outputting means is configured such that only the facility information of the element facility which exists before getting off the expressway is set as the target of searching and outputting, in the case where a route to a destination is set. In this manner, the target for searching is limited in a range of the expressway in which the vehicle is actually about to travel. Therefore, it is possible to avoid a problem that the vehicle was about to stop by at a facility that exists ahead of the point to get off the expressway, and excellent usability can be achieved.

Moreover, in the preferred embodiment, the navigation device comprises means for receiving selection of the target of searching and outputting from among a plurality of types of element facilities. In this manner, a user can randomly set conditions of the types and the like of the element facilities that are the target of searching, thus unwasted information output can be performed to further satisfy the demands.

As described above, the present invention can provide a navigation device, method, and program for outputting information on a desired type of element facility, which exists on an expressway, with simple operation during driving on the expressway.

BEST MODE FOR CARRYING OUT THE INVENTION

Next, embodiments of the present invention (referred to as "embodiments" hereinafter) are described in detail with reference to the drawings. It should be noted that the present embodiment can be realized by controlling a computer provided peripheral devices with a program; however, aspects for realizing by mean of hardware or a program in this case can be changed in various ways. Moreover, in addition to the navigation device and method, the present invention can also be comprehended as the abovementioned program or a computer readable recording medium in which such program is recorded. Therefore, a hypothetical circuit block for realizing the present invention and functions of the present embodiment is used in the following explanations.

[1. Configuration]

[1-1. Entire Configuration]

First, the navigation device in the present embodiment (referred to as "present device" hereinafter) is a navigation device which displays a present location, searches for a route to a destination, and performs guidance on the basis of a prepared road map and road map data of facilities, and comprises the following components which are shown in the functional block diagram of FIG. 1.

Specifically, an absolute position/orientation detection portion 1 is a part for receiving, for example, the GPS radio wave, which is transmitted from a GPS satellite, by means of an antenna or a receiver in order to compute an absolute position coordinate or orientation on the earth's surface for a present position of a vehicle, that is, a vehicle position, the vehicle being installed with the present device. Moreover, a relative orientation detection portion 2 is a part for detecting a relative orientation of the vehicle by means of a gyro or the like. A vehicle speed detection portion 3 is a part for computing speed of the vehicle by processing vehicle speed pulse obtained from the vehicle.

Furthermore, a main CPU and a peripheral circuit 4 are parts that play a role of a control circuit for controlling the entire device. A memory group M is a group of various memories required for operating the present device, and, for example, a ROM 5 for storing a program is accessed by the main CPU when the present device is activated. A main program is loaded into a dynamic RAM (DRAM) 6 which provides a work area and the like. An SRAM (static RAM) 7 is storage means for storing setting and information containing map data, and is provided with battery backup even during a period of time in which the main power supply is turned off. The SRAM 7 provides the memory contents when turned on, but can be replaced with other storage means such as flash memory or a hard disk drive. A VRAM (video RAM) 8 for display stores bitmap data of an image to be displayed on a display portion 10.

The display portion 10 is a part for displaying various information such as map or operation menus to a liquid crystal display screen (not shown), and preferably used in conjunction with voice synthesis. An input portion 11 is a part for the user to input information such as an instruction from a switch, and comprises a touch sensor function, remote control unit, infrared ray transmission unit, and the like, but is preferably configured integrally with the display portion 10, as a touch panel. Furthermore, a user interface portion 9 connects the display portion 10 to the input portion 11, and the main CPU to the peripheral circuit 4 by using an I/O control circuit or a device driver. A CD/DVD-ROM control portion 12 is means for reading various data such as a navigation program recorded in a CD-ROM or DVD-ROM from a database.

An FM multiplex receiving and processing portion 13 is a part that receives an FM broadcast wave to perform processing of reading desired data such as traffic information of a VICS service from the broadcast wave, and the traffic information containing traffic congestion information. A light/beacon receiving and processing portion 14 is a part for receiving identification information of each beacon and the traffic information of the VICS service from a light beacon or a radio wave beacon installed on a road shoulder, and processing such information. A voice recognition portion 15 is a portion for recognizing words including a voice and an instruction word of the user.

[1-2. Roles of Main CPU and Peripheral Circuit]

Figure 1:
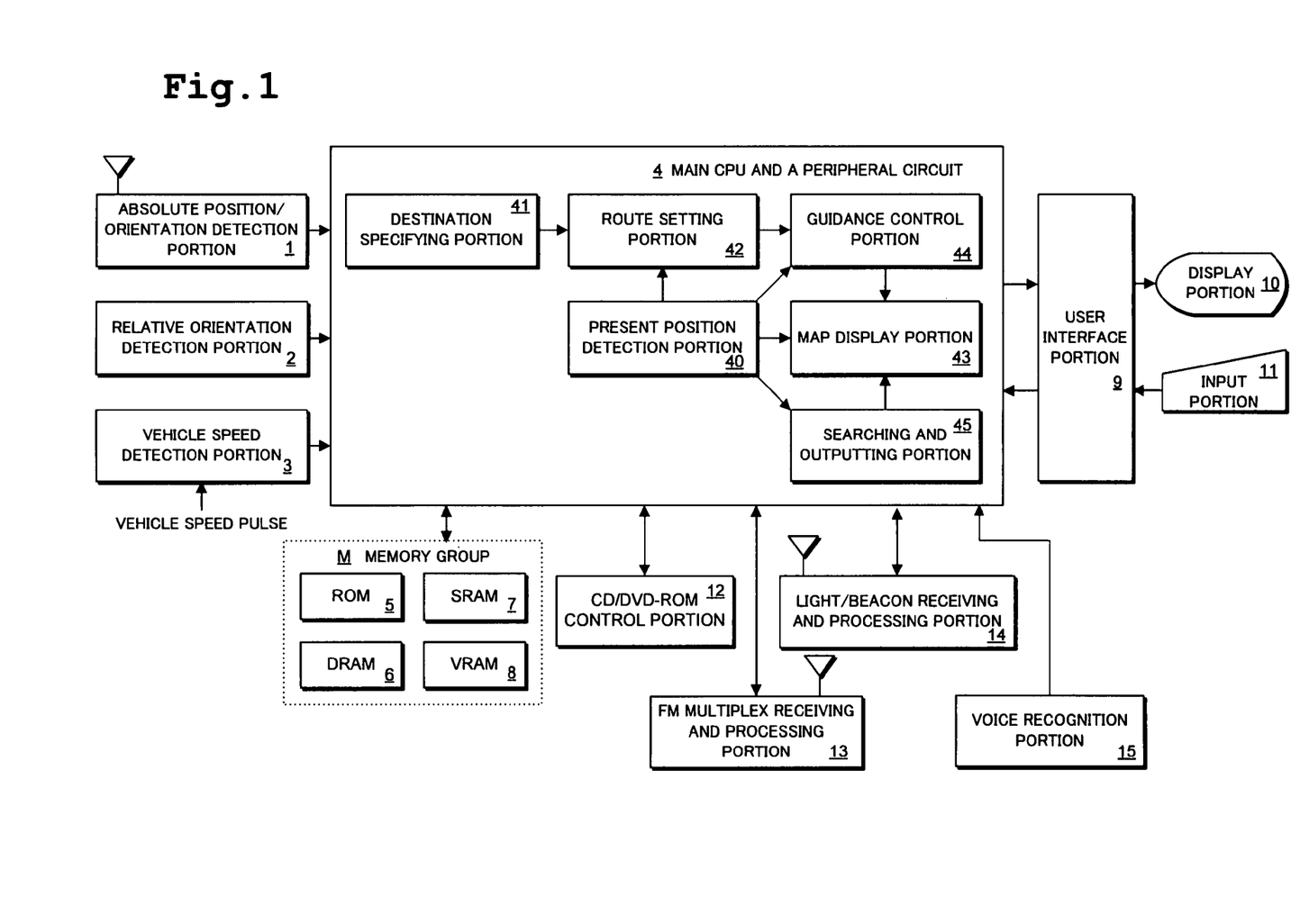
FIG. 1 is a functional block diagram showing a configuration of embodiments of the present invention.

The main CPU and its peripheral circuit 4 is configured to realize the roles of the following components shown in FIG. 1 by means of the program operation described above. Specifically, a present position detection portion 40 is means for sequentially computing the vehicle position, and specifically is configured to compute the vehicle position by combining GPS navigation and positioning and autonomous navigation and positioning.

Here, GPS navigation and positioning is to compute the present position using information obtained from the absolute position/orientation detection portion 1 on the basis of radio wave from a satellite. Autonomous navigation and positioning is to compute the present position using information obtained from the relative orientation detection portion 2 and vehicle speed detection portion 3 on the basis of the earth magnetism and vehicle speed.

Further, a destination specifying portion 41 is means for receiving input of a destination which is performed by searching for a facility from the database in which the road map data is recorded, or by specifying the destination with a cursor on the map. A route setting portion 42 is means for computing a route to an input destination on the basis of the road map data, or requesting a predetermined server to compute the input destination through communication, and then setting a route thus obtained as a result.

Moreover, a map display portion 43 is means for displaying the vehicle position on the circumference map along with at last part of the route on the display portion 10 in the form of a three-dimensional display or in other forms on the basis of computed vehicle position and the road map data. A guidance control portion 44 is means for determining a part of a route to be displayed and a component for enhancing the part with blinking light, and controlling guidance by being used in conjunction with voice synthesis. A searching and outputting portion 45 is configured as means for operating as described hereinafter by means of the above-described program operation.

[2. Operation]

[2-1. Highway Mode]

Figure 2:
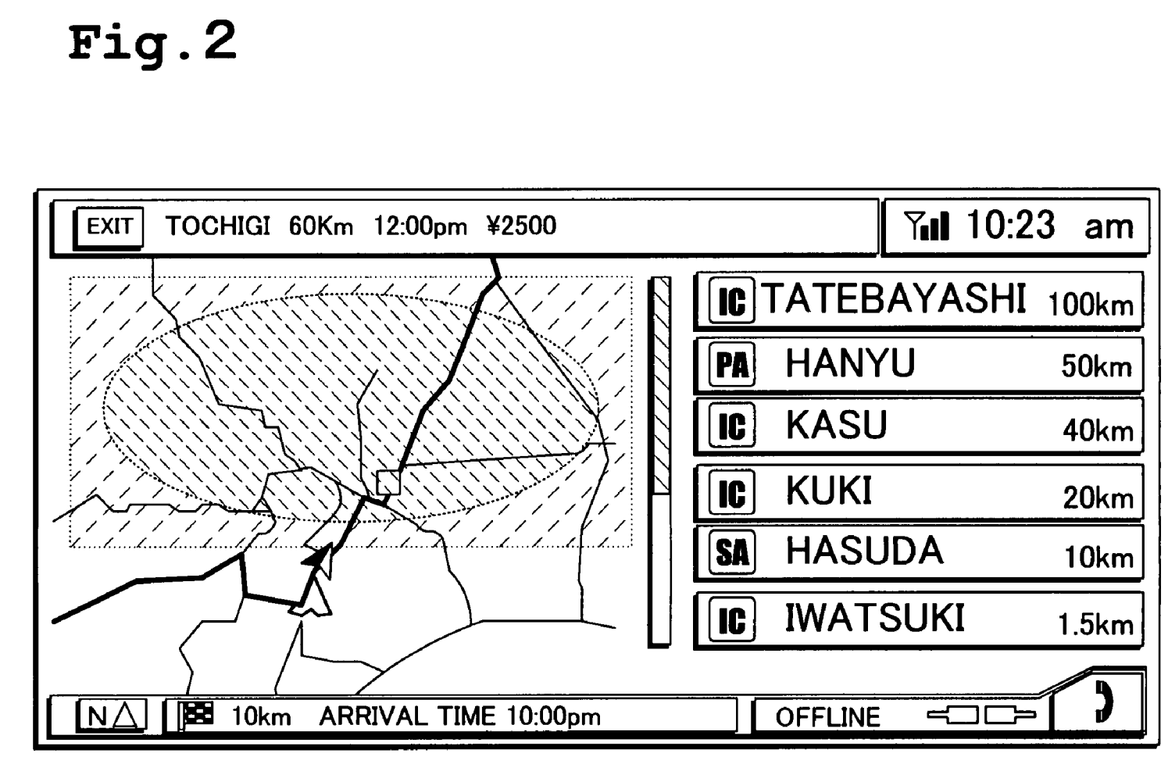
FIG. 2 is a figure showing an example of a display of a highway mode in the embodiments of the present invention.

First, in the present embodiment a display mode such as a map not only includes a general road display mode which displays facilities such as general roads, family restaurants, and convenience stores, but also includes a highway mode. The highway mode is a predetermined expressway display mode which displays expressways and facilities on the expressways, and combines a simple map focusing mainly on expressways so that the expressways can be easily recognized, and a moving image, as shown in FIG. 2. It should be noted that the display screen shown of the present embodiment, as shown in FIG. 2, is preferably designed such that predetermined processing is performed each time by touching each part using the touch panel.

Figure 3:
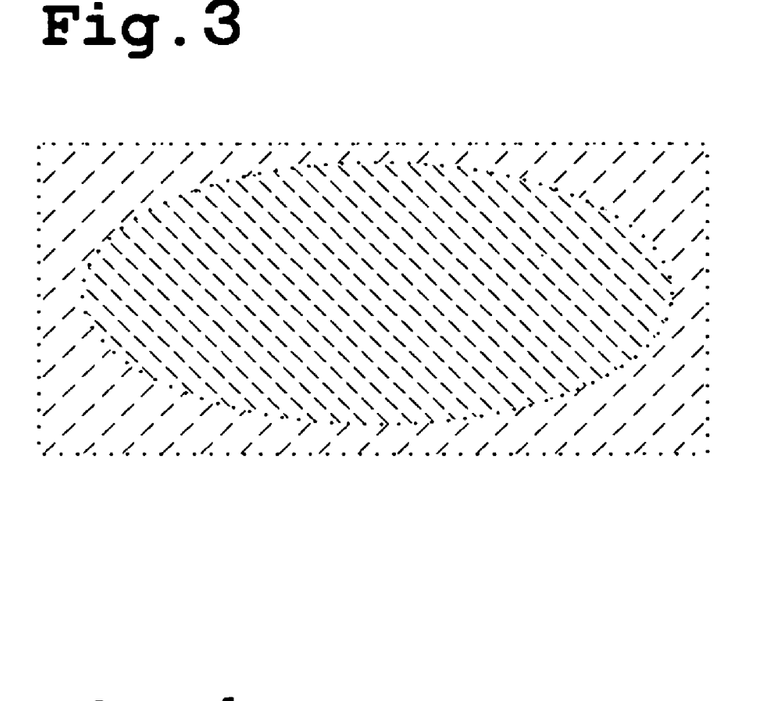
FIG. 3 is a figure showing an example of a background which is used in the highway mode in the embodiments of the present invention.
Figure 4:
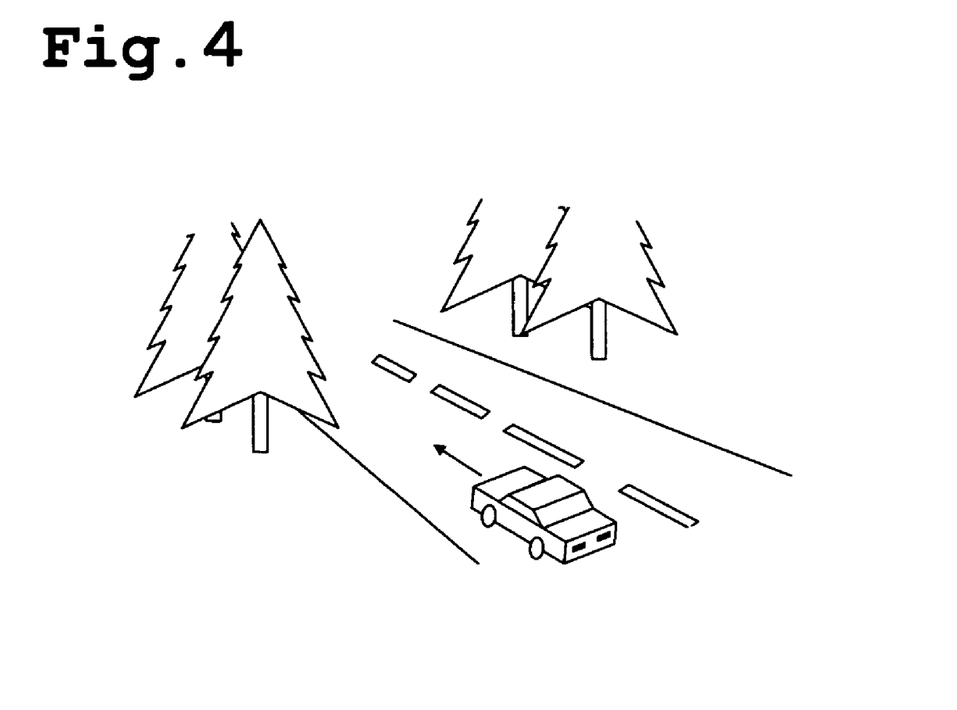
FIG. 4 is a figure showing an example of an original stipple drawing which is used in movie display in the embodiments of the present invention.

The highway mode described above displays a moving image (movie) which images a scene of a vehicle driving on an expressway in the map as the background. The movie is operated by switching a frame of an original stipple drawing (113×50 dots, 15 colors), as shown in FIG. 4, on a background bitmap (for example, 226×100 dots), for example, as shown in FIG. 3. Regarding the stipple, a moving image in which each space between the dots is opened can be replayed. Furthermore, other backgrounds on the map besides the movie part may be scribbled out with, for example, a predetermined color without using the bitmap.

The map displayed in such background is displayed such that the scale thereof is fixed to 1.5 km or the like, and the direction thereof is oriented head up (traveling direction is directed upward). Considered is an aspect in which a horizontally long display is used by dividing it into two right and left screens, wherein a map display area is displayed on, for example, the left side; however, the display can be used as one desires.

Moreover, the map in the highway mode does not display general roads such as national roads and sites, thus displayed contents are limited to the contents described below, for example. First, as components specific to the present embodiment, the considered components to be displayed are an expressway formed with a predetermined color and width of dots, a waterfront with a predetermined color, a facility icon of the nearest facility, which is colored with yellow or a predetermined color, and an address written with letters of a predetermined character type, size, and color. Moreover, as components to be displayed according to a general map, a mark of the vehicle, a route (a set guidance route), a direction to the destination shown in a red dotted line, a flag such as a checkered flag showing the destination can be considered.

In such highway mode, components such as an interchange (IC), parking area (PA), service area (SA), and junction (JC) may be displayed on, for example, the right side screen, as shown in FIG. 2. The list display of FIG. 2 has six items which are arranged so that the nearest facility is listed at the bottom. In this case, if the number of items is less than six, an embodiment is possible in which the background of the list is shown from the top without displaying the items. Further, a vertically long bar on the left side of the list displays a traveled distance on the expressway, and shows the distance to an exit with light blue, white, or other predetermined color. For example, as the exit nears, the portion of a red bar showing the traveled distance increases.

[2-2. Information Screen During Highway Mode]

Figure 5:
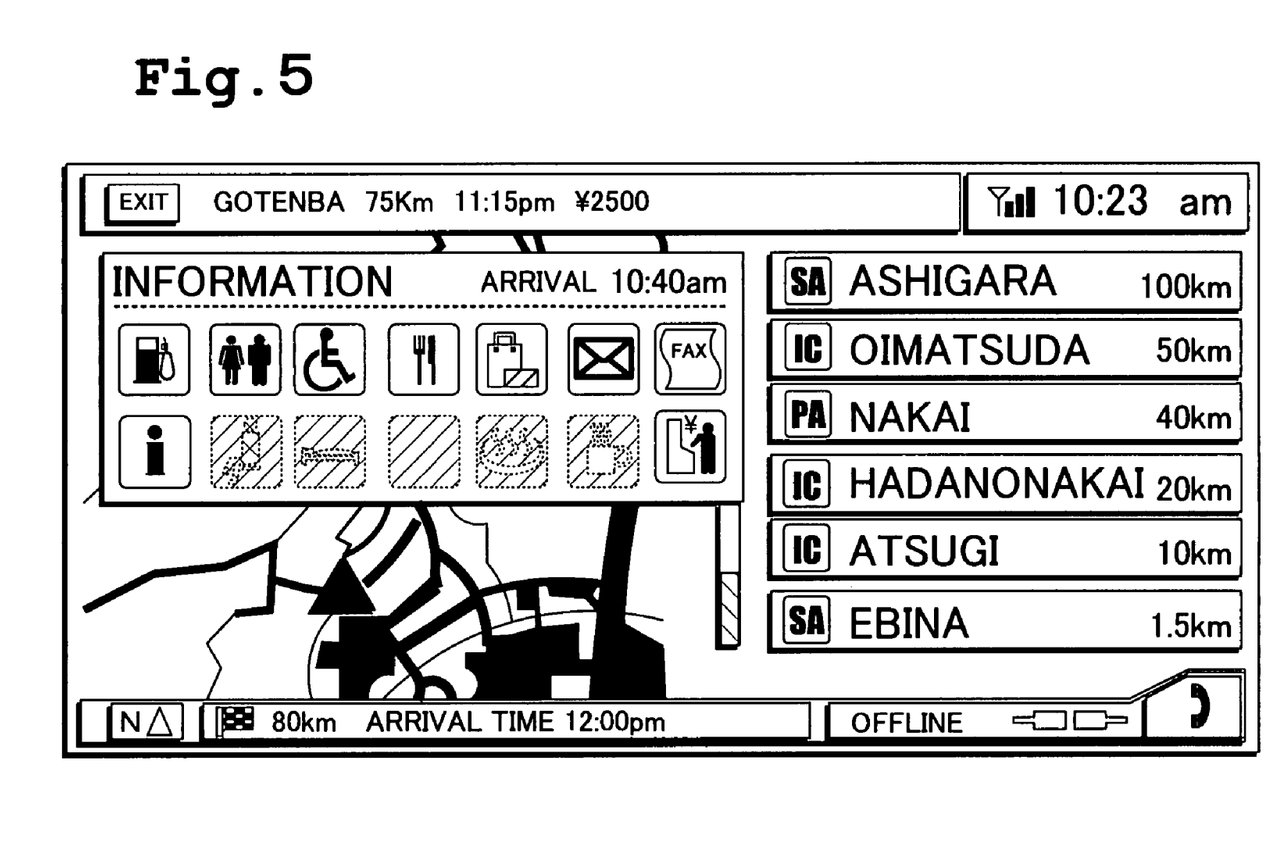
FIG. 5 is a figure showing an example of a display related to a nearest facility in the embodiments of the present invention.

When approaching a predetermined facility during driving on an expressway in the highway mode, information on a nearest facility (SA, PA and the like) is displayed, as shown in FIG. 5. Timing for displaying the information may be the same timing for displaying a guide for a fork in the road. For this facility information, the presence of each of several types of element facilities that is possibly included in facilities is displayed with an icon.

Examples of the element facilities include a fueling station, restroom, bathroom for disabled people, mail box, faxing service, information providing area, bench for resting, napping facility, amusement place, bathing facility, cash dispenser (automatic teller machine), and other elements. These element facilities are displayed on the screen in the form of the particular shape, company logo, and landmark for each facility, and displayed by distinguishing each element such that if a certain element facility exists, it is displayed with a green icon, and if it does not exist, it is displayed with a gray icon with a black outline.

[2-3. Output of Information of Element Facility]

Next, the searching and outputting portion 45, which is the searching and outputting means, searches for a predetermined number of facility information items of a desired type of element facility from the road map data in accordance with a provided predetermined operation, and outputs the information items when the present location is on the expressway, the element facility existing ahead on the expressway. Such processing of outputting the element facility information is called "information pickup processing." Regarding whether or not the present location exists on an expressway can be judged on the basis of, for example, whether the above-described highway mode is used or not; however, a display function for the highway mode is not required. Therefore, instead of the display function, the scope of the present invention includes an aspect in which whether or not the present location exists on an expressway is judged on the basis of information on success and failure when matching the expressway and the map, identification information from a road side beacon, information on whether climbing or descending a ramp slope, and other information.

Figure 6:
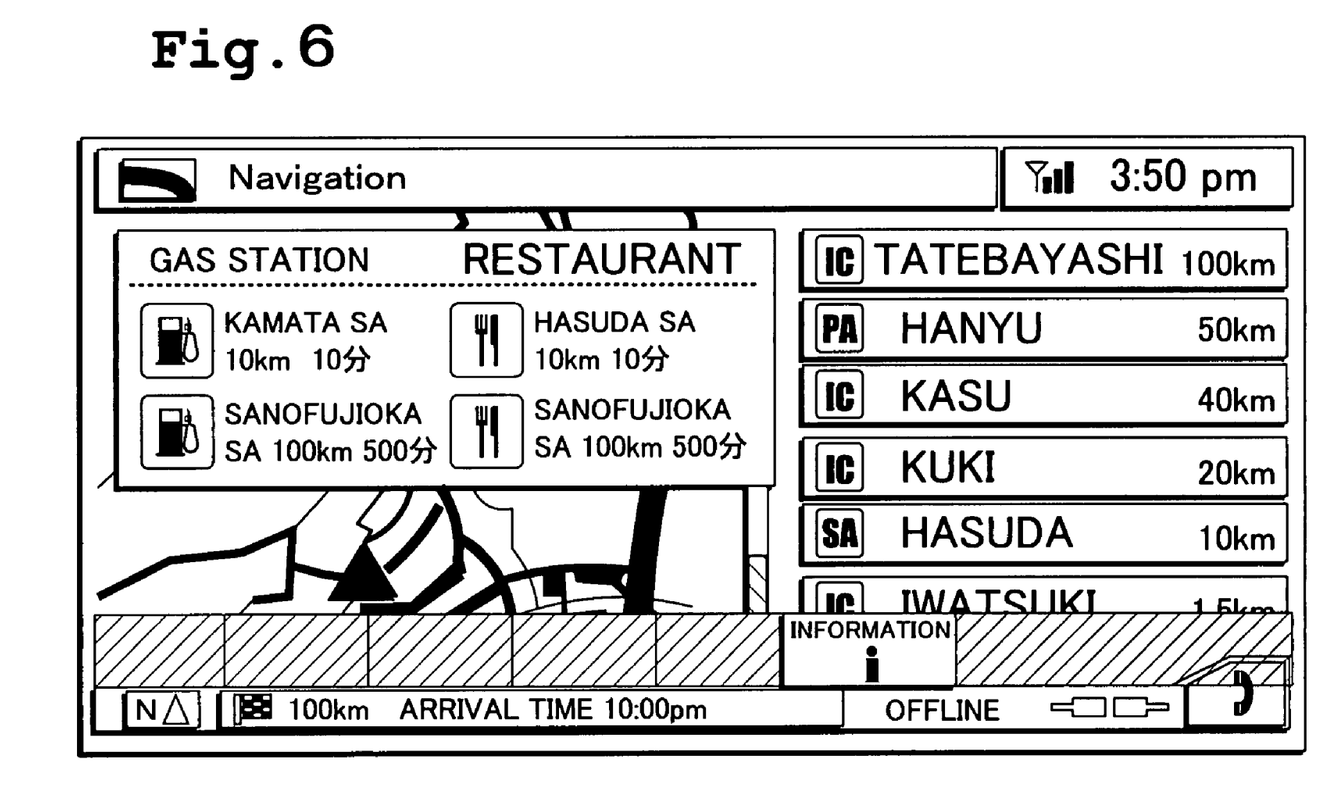
FIG. 6 is a figure showing an example of a display related to an element facility in the embodiments of the present invention.

For example, when operating a predetermined menu key displayed on a touch panel screen of the present device, keys such as "destination," "home," "present location," . . . "information i", and the like appear as shown at the bottom of FIG. 6, and when operating "information i key" among the above keys, the information pickup processing for displaying information on desired types of element facilities, as shown in the upper part of FIG. 6, is executed.

Figure 7:
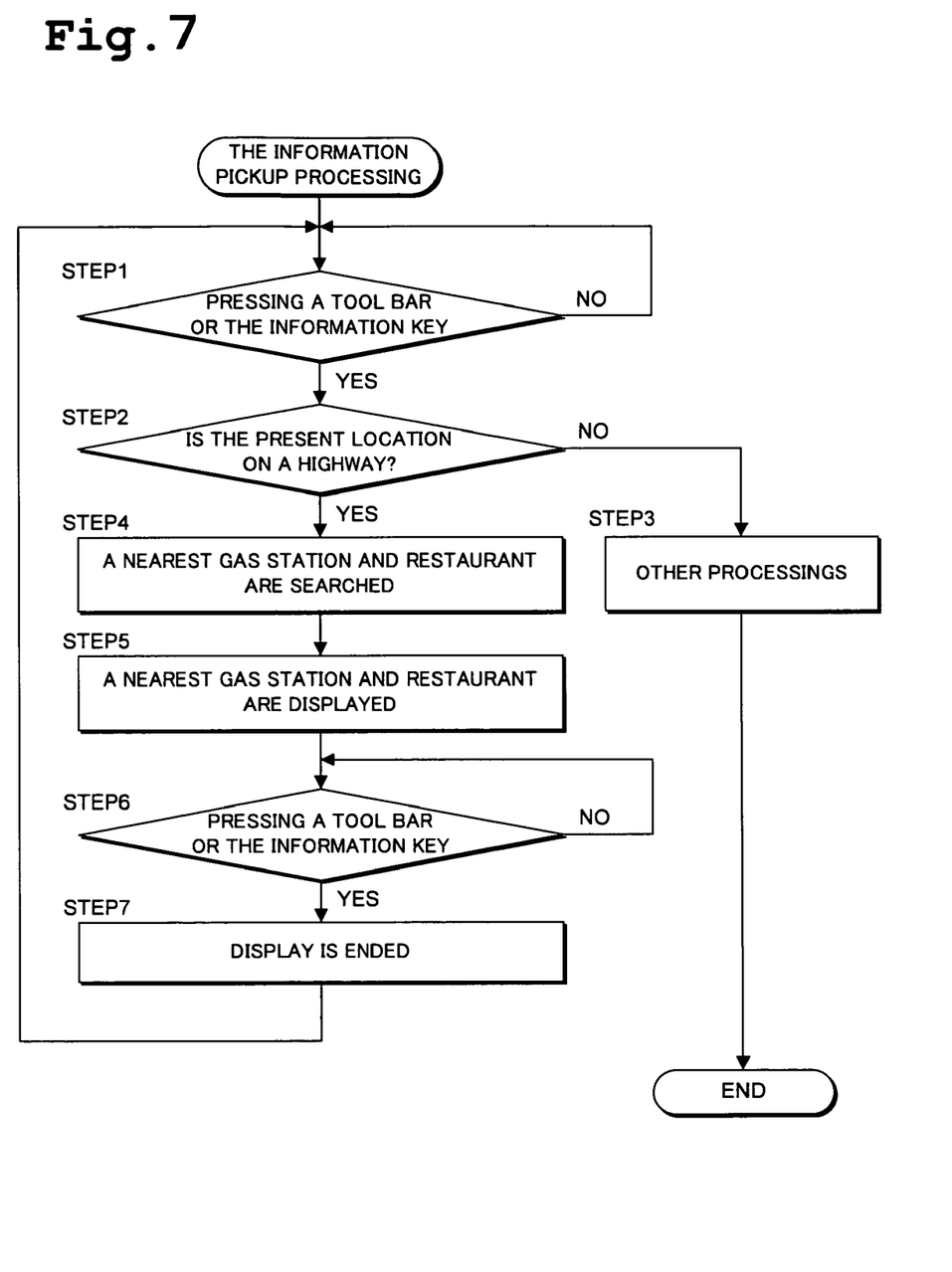
FIG. 7 is a flowchart showing a procedure of processing in the embodiments of the present invention.

Typically, as shown in FIG. 7, when performing predetermined operations such as pressing a tool bar or the information key (step 1), if the present location is on a highway (step 2), information items of a nearest gas station and restaurant (for example, first and second nearest) are searched (step 4) and displayed (step 5) as the facility information on desired types of facilities, and if the information key us pressed again (step 6), display is ended (step 7).

Figure 8:
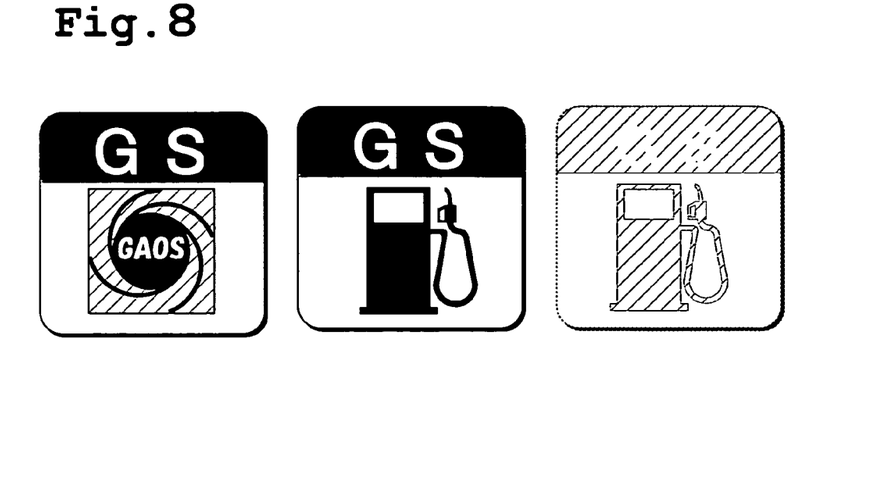
FIG. 8 is a figure showing an example of marks used for display in the embodiments of the present invention.

Aspects of displaying marks and the like for each element facility in the above case are not limited, thus, in the case of the gas station, for example, if the gas station has a landmark such as a company logo, such landmark may be displayed on a white background. If there is no such landmark, a green icon in a predetermined shape is displayed. For example, FIG. 8 shows an example of a mark representing a gas station, in which are displayed, from the left, a case where a landmark exists, a case where no landmark exists, and a case where no gas station exists.

[2-4. Example of Information]

Figure 9:
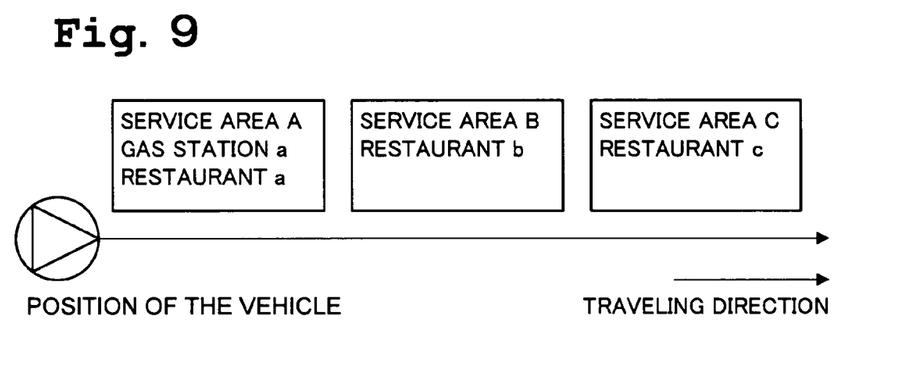
FIG. 9 is a figure showing an example of the positional relationship of a vehicle position with respect to each of the service areas in the embodiments of the present invention.
Figure 10:
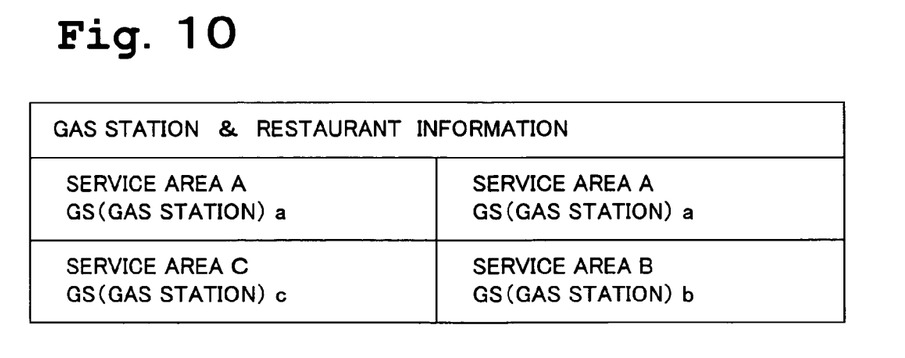
FIG. 10 is a figure showing an example of information on the element facility in the embodiments of the present invention.

Incidentally, the element facilities according to categories of which information thereof is to be displayed, e.g. gas station and restaurant, do not always line up in the same service area or parking area. For example, a case can be considered in which a gas station a and a restaurant b are both present in a service area A, but only the restaurant b exists in a service area B, and only a gas station c exists in a service area C, as shown in FIG. 9. In this case, in order to display two information items for each type of element facility, for the gas stations, the gas station a in the service area A and the gas station c in the service area C are displayed, and, for the restaurants, the restaurant a in the service area A and the restaurant b in the service area B are displayed.

Accordingly, the user can easily make judgment in accordance with a type of a desired element facility, when, for example, "there is no gas station after the service area A until the service area C which is two service areas away, so the car should be fueled well in advance", or in a case where "there are restaurants in the service area B even if the restaurants in the service area A are full."

[2-5. Other Display]

It should be noted in the highway mode that a plurality of types of moving image patterns may be displayed and replayed according to circumstances. For example, by displaying different moving image patterns that differ according to types of events, such as starting and ending of the highway mode, noticing of starting the guidance on diverged roads, and reporting that an interchange, junction, service area, parking area and the like have been passed, it is possible to transmit the information specifically to the user by means of the variety of interesting display effects.

Specific contents of the moving image patterns are any contents as one desires. An effect of displaying the moving image patterns is that, for example, a state in which a central position is fixed for the shape of a certain pattern or the like, and spaces between the pixels configuring the shape are changed such as three-dot space→two-dot space→one-dot space→no space so that the spaces between the pixels narrow down from side to side and up and down, and a state in which the spaces are changed such as no space→one-dot space→two-dot space→three-dot space so that the spaces expand from side to side and up and down can be respectively displayed with a simple algorithm having a common element.

Moreover, by allowing the user to select the setting of the presence of a moving image, or by displaying different moving image patterns normal driving (for example, 30 km/h or more) and driving in traffic congestion (for example, less than 30 km/h), variations of more finely detailed display can be realized, and the moving image patterns may be checked by means of predetermined operation.

[3. Effect]

As described above, in the present embodiment, if the present location is on an expressway, predetermined simple operation by pressing an information key or the like allows to search a predetermined number of desired types of element facilities such as gas stations or restaurants in service areas (SA) or parking areas (PA), which exist ahead in the traveling direction on the expressway, in the order of nearest to furthest from the present location, and to output the searched facilities by means of the display on the screen and speech synthesis. Accordingly, the information on the desired types of element facilities existing on the expressway can be output with simple operation.

[4. Other Embodiments]

It should be noted that the present invention is not to be limited to the above embodiment, and thus includes other embodiments as described hereinafter. For example, the number of desired types of element facilities to be searched and output is not limited to two or three, and thus may be one, four or more. Furthermore, the flowchart of FIG. 7 shows that after "displaying information on gas station and restaurant" (step 5), display of the information is ended (step 7) when "press information key" is detected (step 6); however, for example, when the nearest junction is behind the vehicle since the vehicle has moved, and consequently the next junction becomes the nearest junction, the display of the information may be ended. Also when a predetermined length of time has elapsed since display of the information has started, the display of the information may be ended automatically.

The searching and outputting portion 45 may be configured such that only the facility information of the element facility which exists before getting off the expressway is set as the target of searching and outputting, in the case where a route to a destination is set. Accordingly, by limiting the target of searching in a range of the expressway in which the vehicle is actually about to travel, it is possible to avoid a problem that the vehicle was about to stop by at a facility that exists ahead of the point to get off the expressway, and excellent usability can be achieved.

Moreover, the above embodiments have described an example in which the two nearest gas stations and restaurants are searched and output by pressing the information key; however, means for receiving selection on what to search and output may be provided, in which the target of searching and outputting is selected from among a plurality of types of element facilities, the selection being performed by on/off operation on the screen for each type of element facility. Accordingly, a user can randomly set conditions of the types and the like of the element facilities that are the target of searching, thus unwasted information output can be performed to further satisfy the demands.

The invention claimed is:

1. A navigation device which displays a present location, searches for and guides on a route to a destination, on the basis of a prepared road map and data of facilities, wherein the navigation device comprises:

searching and outputting unit for searching for and outputting a predetermined number of facility information items of a desired type of element facility included in facilities existing ahead on an expressway, when the present location is on an expressway, from the data of facilities in accordance with a predetermined operation performed; and a predetermined key for user activation wherein, the searching and outputting unit is configured to simultaneously output two or more of the facilities including facility information of two or more element facilities automatically together with related information of element facilities including a name of element facility, a distance from the present location and a required time period from the present location, when operating the predetermined key for displaying information on desired types of element facilities on an already displayed map in the highway mode.

2. The navigation device according to claim 1, wherein the searching and outputting unit is configured to display only the facility information of the element facility which exists before getting off the expressway, when the facility information is set as a target for searching and outputting, in the case in which the route to a destination is set.

3. The navigation device according to claim 2, further comprising an input portion, which enables the user to input information into a receiving selection to designate a target for searching and outputting from among a plurality of types of element facilities.

4. A navigation method of displaying a present location on a display unit, searching for and guiding on a route to a destination with a computer, on the basis of a prepared road map and data of facilities, wherein the method comprises the steps of:

searching and outputting a predetermined number of facility information items of a desired type of element facility included in the facilities existing ahead on an expressway, when a present location is on an expressway, from data of facilities in accordance with a predetermined operation to be performed, and wherein the computer executes a process of simultaneously outputting two or more of the facilities including facility information of two or more element facilities together with related information of element facilities including a name of an element facility, a distance from the present location and a required time period from the present location, when a user operates a predetermined key for displaying information on desired types of element facilities on an already displayed map in the highway mode.

5. The navigation method according to claim 4, wherein the process of searching and outputting is configured to display only the facility information of the element facility which exists before getting off the expressway when the facility information items are set as a target for searching and outputting, in the case in which the route to a destination is set.

6. The navigation method according to claim 5, further comprising the process of receiving a selection of the target for searching and outputting from among a plurality of types of element facilities.

7. A computer readable medium storing a navigation program which controls a computer to display a present location, search for and guide a route to a destination on the display, on the basis of a prepared road map and data of facilities, wherein the program causes the computer to, execute a process of searching and outputting a predetermined number of facility information items of a desired type of element facility included in the facilities existing ahead on an expressway, when the present location is on an expressway, from the data of facilities in accordance with a predetermined operation to be performed and wherein the computer is caused to execute a process of simultaneously outputting two or more of the facilities including facility information of two or more element facilities together with related information of element facilities including a name of an element facility, a distance from the present location and a required time period from the present location, when a user operates a predetermined key for displaying information on desired types of element facilities on an already displayed map in the highway mode.

8. The navigation program according to claim 7, wherein, in the process of searching and outputting, the program causes the computer to set only the facility information of the element facility existing before getting off the expressway, as a target for searching and outputting, in the case in which the route to a destination is set.

9. The navigation program according to claim 8, further causing the computer to receive a selection of the target for searching and outputting from among a plurality of types of element facilities and displaying an icon indicating that an element facility does not exist.

10. The navigation device according to claim 1, further causing a computer to receive a selection of a target for searching and outputting from among a plurality of types of element facilities.

11. The navigation method according to claim 4, further comprising the process of receiving a selection of a target for searching and outputting from among a plurality of types of element facilities.

12. The navigation program according to claim 7, further causing the computer to receive selection of the target for searching and outputting from among a plurality of types of element facilities.

13. The navigation device according to claim 1, further including configuring the searching and outputting means to set a plurality of types of moving image patterns representative of driving patterns based on a speed of a vehicle.

14. The navigation method according to claim 4, further including enabling the user to set a plurality of types of moving image patterns representative of driving patterns based on a speed of a vehicle.

* * * * *